(12) United States Patent
Lee

(10) Patent No.: US 10,191,227 B2
(45) Date of Patent: Jan. 29, 2019

(54) FIBER OPTIC CONNECTOR WITH SMALL PROFILE, AND CABLE ASSEMBLIES, SYSTEMS, AND METHODS INCLUDING THE SAME

(71) Applicant: Alliance Fiber Optic Products, Inc., Sunnyvale, CA (US)

(72) Inventor: Jhih-Ping Lee, New Taipei (TW)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 15/435,449

(22) Filed: Feb. 17, 2017

(65) Prior Publication Data

US 2017/0205588 A1    Jul. 20, 2017

Related U.S. Application Data

(63) Continuation of application No. PCT/US2016/067903, filed on Dec. 21, 2016.

(60) Provisional application No. 62/388,129, filed on Jan. 20, 2016, provisional application No. 62/398,673, filed on Sep. 23, 2016.

(51) Int. Cl.
*G02B 6/38* (2006.01)
*G02B 6/44* (2006.01)

(52) U.S. Cl.
CPC ......... *G02B 6/3878* (2013.01); *G02B 6/3821* (2013.01); *G02B 6/3825* (2013.01); *G02B 6/3887* (2013.01); *G02B 6/3893* (2013.01); *G02B 6/3897* (2013.01); *G02B 6/4453* (2013.01)

(58) Field of Classification Search
CPC .. G02B 6/4446; G02B 6/4452; G02B 6/4457; G02B 6/4471; H05K 7/16
See application file for complete search history.

(56) References Cited

U.S. PATENT DOCUMENTS 5,076,656 A    12/1991  Briggs et al.
6,447,170 B1 *  9/2002  Takahashi .......... H01R 13/6273
                                                385/53

(Continued)

FOREIGN PATENT DOCUMENTS

CN    204595258 U    8/2015
EP       969300 A2    5/2000

(Continued)

OTHER PUBLICATIONS

International Search Report and Written Opinion, PCT/US2016/0137903, dated Feb. 17, 2017, 13 Pages.

*Primary Examiner* — Thomas A Hollweg
*Assistant Examiner* — Erin Chiem
(74) *Attorney, Agent, or Firm* — Adam R. Weeks

(57) ABSTRACT

A fiber optic connector includes at least one ferrule configured to support at least one optical fiber, an inner connector body having a front end from which the at least one ferrule extends, a latch arm extending outwardly from the inner connector body, and a handle. The handle has a housing portion in which the inner connector body is at least partially received and a grip portion extending rearwardly from the housing portion. The handle can move relative to the inner connector body so that the housing portion can cause the latch arm to flex toward the inner connector body.

26 Claims, 11 Drawing Sheets

(56) References Cited

U.S. PATENT DOCUMENTS

2012/0141074 A1 6/2012 Sabo
2015/0177463 A1 6/2015 Lee et al.

FOREIGN PATENT DOCUMENTS

JP 2005173173 A 6/2005
JP 2015200771 A 11/2015

* cited by examiner

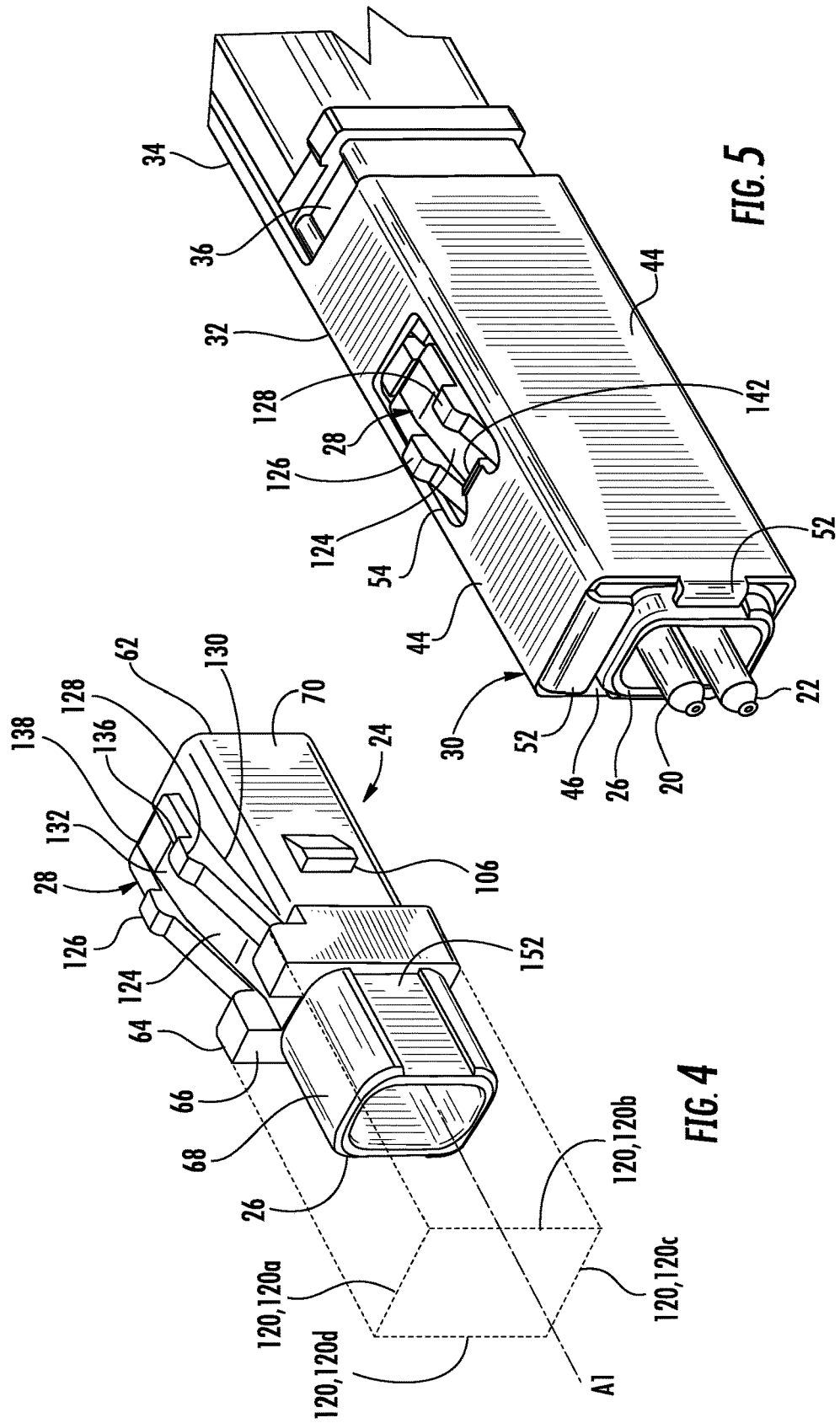

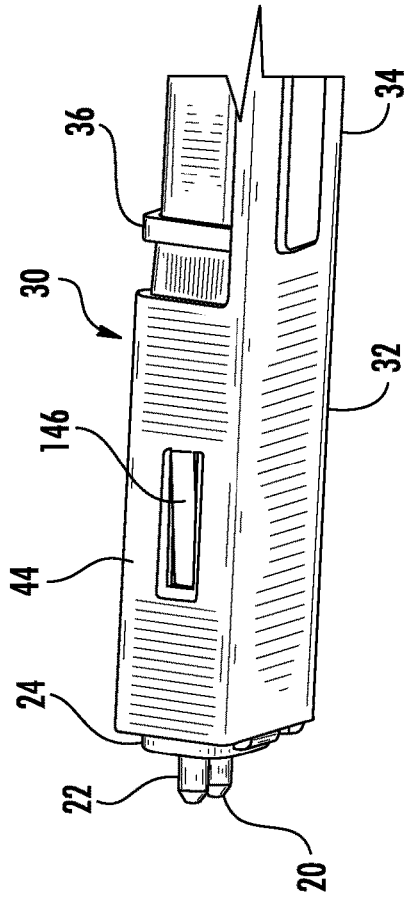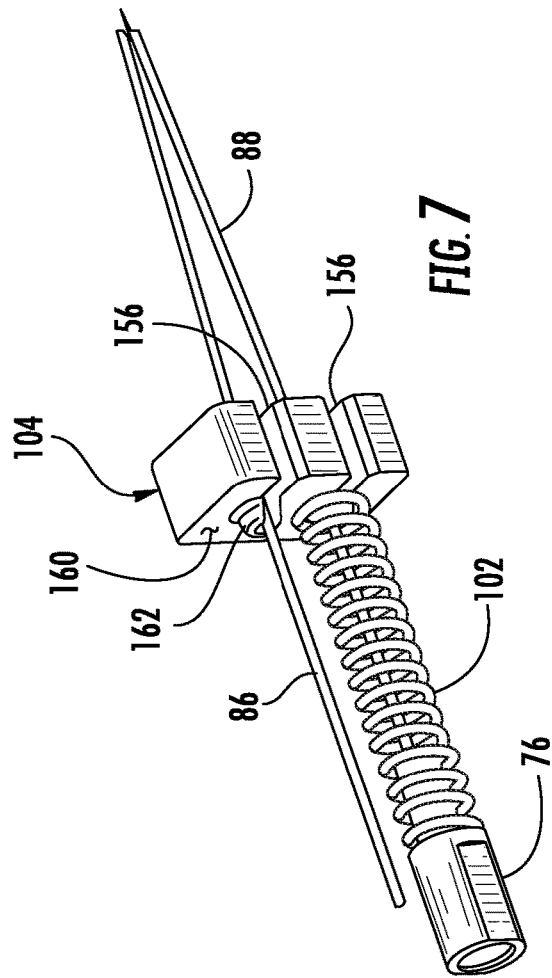

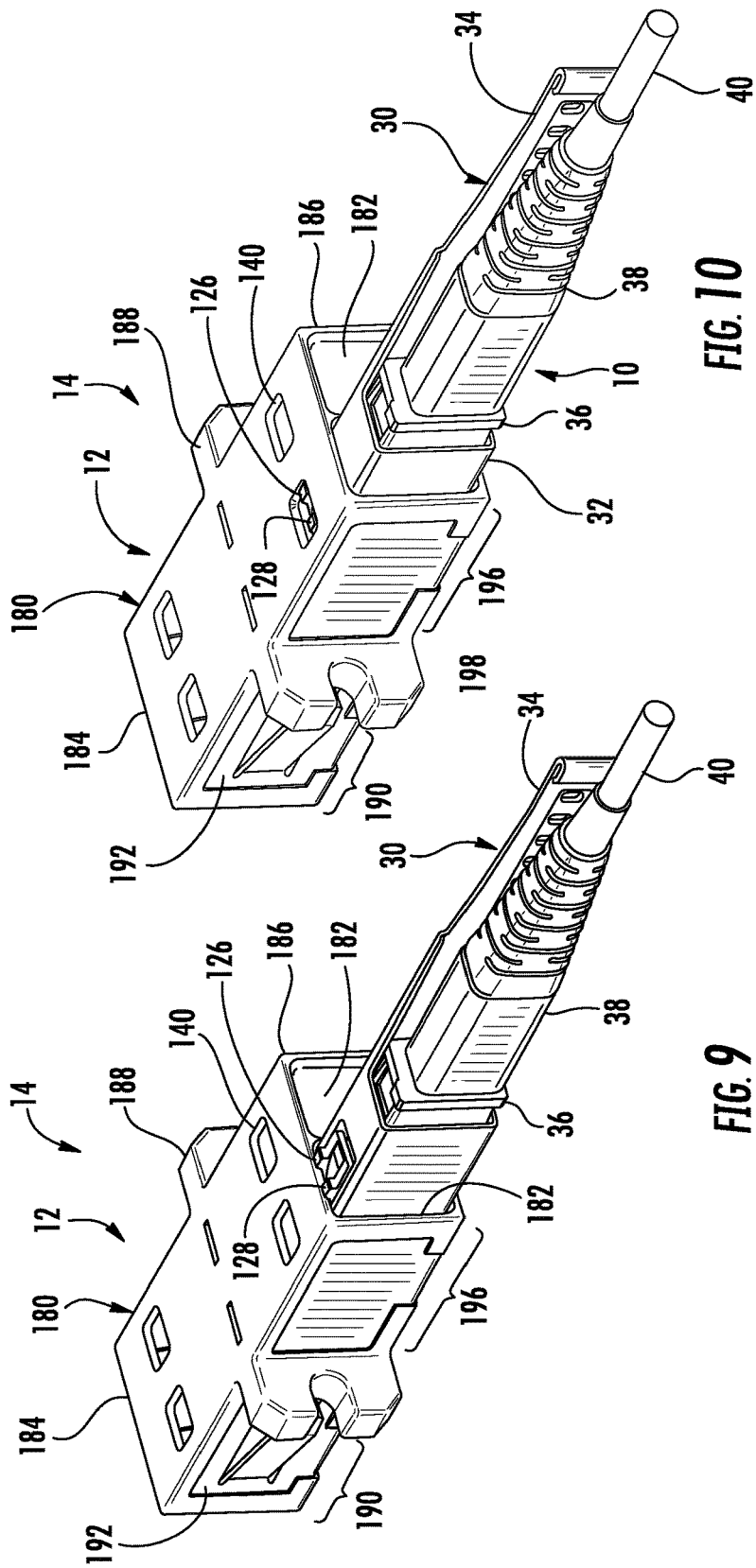

FIBER OPTIC CONNECTOR WITH SMALL PROFILE, AND CABLE ASSEMBLIES, SYSTEMS, AND METHODS INCLUDING THE SAME

PRIORITY APPLICATIONS

This application is a continuation of PCT/US2016/067903, filed on Dec. 21, 2016, which claims the benefit of priority of U.S. Provisional Application Ser. No. 62/388,129, filed on Jan. 20, 2016, and U.S. Provisional Application Ser. No. 62/398,673, filed on Sep. 23, 2016, the content of all applications being relied upon and incorporated herein by reference in its entirety.

BACKGROUND

This disclosure relates generally to fiber optic connectors, and more particularly fiber optic connectors suitable for use in data centers or the like. This disclosure also relates to cable assemblies, systems, and methods including such fiber optic connectors.

Optical fibers and copper wires are useful in a wide variety of applications, including the telecommunications industry for data transmission. In a telecommunications system that uses either of these data transmission elements, there are typically many locations where cables that carry the elements connect to equipment or other cables. Connectors are typically provided on the ends of the cables to conveniently provide these connections. The connectors are designed to be received in ports that align the optical fiber(s) carried by connectors with the optical fiber(s) of other connectors or with equipment (e.g., transceivers) so that data can be transmitted between the components.

The demand for high bandwidth tends to drive a need for high-density interconnects, i.e. a large number of optical connections in a given space. By increasing the number of optical connections, more data can be transmitted in the given space. It can be a challenge, however, to design fiber optic connectors cable of providing high-density interconnects. The fiber optic connectors often become more difficult to handle and less robust as components are made smaller.

SUMMARY

According to one embodiment of this disclosure, a fiber optic connector comprises at least one ferrule configured to support at least one optical fiber, an inner connector body having a front end from which the at least one ferrule extends, a latch arm extending outwardly from the inner connector body, and a handle having a housing portion in which the inner connector body is at least partially received and a grip portion extending rearwardly from the housing portion. The handle can move relative to the inner connector body so that the housing portion can cause the latch arm to flex toward the inner connector body. For example, the handle may be movable between a forward position in which the housing portion does not flex the latch arm and a rearward position in which the housing portion flexes the latch arm toward the inner connector body.

According to another embodiment of this disclosure, a fiber optic connector like the one mentioned above may include at least two ferrules. For example, a fiber optic connector may comprise first and second ferrules each configured to support at least one optical fiber and arranged to extend parallel to each other in a ferrule plane. The fiber optic connector may also comprise an inner connector body having a front end from which the first and second ferrules extend, a latch arm extending outwardly from the inner connector body and intersecting the ferrule plane, and a handle having a housing portion in which the inner connector body is at least partially received and a grip portion extending rearwardly from the housing portion. Again, the handle can move relative to the inner connector body so that the housing portion can cause the latch arm to flex toward the inner connector body.

According to another embodiment of this disclosure, a fiber optic connector comprises at least one ferrule configured to support at least one optical fiber, an inner connector body extending along a longitudinal axis and having a front end from which the at least one ferrule extends, a latch arm extending outwardly from the inner connector body, the latch arm having first and second latching features spaced apart from each other in a direction transverse to the longitudinal axis, and a handle having a housing portion in which the inner connector body is at least partially received and a grip portion extending rearwardly from the housing portion. The handle can move relative to the inner connector body so that the housing portion can cause the latch arm to flex toward the inner connector body. Additionally, the housing portion of the handle includes a pushing feature for contacting the latch arm to cause the latch arm flex toward the inner connector body. Furthermore, the latch arm includes a ramp that the pushing feature can slide along, and the ramp is positioned between the first and second latching features.

According to yet another embodiment of this disclosure, a fiber optic connector comprises at least one ferrule configured to support at least one optical fiber, an inner connector body having a front end from which the at least one ferrule extends, a latch arm extending outwardly from the inner connector body, a handle having a housing portion in which the inner connector body is at least partially received and a grip portion extending rearwardly from the housing portion, an outer spring received over a portion of the inner connector body within the housing portion of the handle. The handle can move relative to the inner connector body so that the housing portion can cause the latch arm to flex toward the inner connector body. Additionally, the outer spring biases the housing portion of the handle relative to the inner connector body.

According to still another embodiment of this disclosure, a fiber optic connector comprises at least one ferrule each configured to support at least one optical fiber, an inner connector body having a front end from which the at least one ferrule extends and a back end opposite the front end, a latch arm extending outwardly from the inner connector body, an outer connector body coupled to the back end of the inner connector body, and at least one inner spring extending within the inner connector body and outer connector body. The at least one inner spring biases the at least one ferrule toward the front end of the inner connector body. The fiber optic connector also includes a spring push received in the outer connector body. The spring push includes at least one slot for accommodating the at least one optical fiber that the at least one ferrule is configured to support. Additionally, the spring push defines at least one spring seat for positioning the at least one inner spring in the outer connector body.

Fiber optic connectors in this disclosure, including those summarized above, may be provided as part of a cable assembly. As an example, a cable assembly may include a fiber optic cable having first and second optical fibers. The cable assembly may also include any of the fiber optic connectors mentioned above that include first and second ferrules, with the fiber optic connector mounted on the fiber optic cable. The first and second optical fibers of the fiber optic cable are supported by the respective first and second ferrules of the fiber optic connector.

Fiber optic connectors in this disclosure, including those summarized above, may also be provided together with an adapter as part of a system. As an example, a fiber optic connector system may include any of the fiber optic connectors mentioned above that include first and second ferrules and a handle, and an adapter. The adapter includes an adapter body defining a port into which the fiber optic connector can be inserted and an adapter latching feature communicating with the port. The adapter also includes first and second sleeves disposed in the port for receiving the first and second ferrules when the fiber optic connector is inserted into the port. Additionally, the housing portion of the handle of the fiber optic connector is configured to be received in the port, and the latch arm on the inner connector body of the fiber optic connector is configured to engage the adapter latching feature to retain the fiber optic connector in the port.

As another example, a fiber optic connector system may comprise a fiber optic connector that includes: at least one ferrule configured to support at least one optical fiber; an inner connector body having a front end from which the at least one ferrule extends; a latch arm extending outwardly from the inner connector body; and a handle having a housing portion in which the inner connector body is at least partially received and a grip portion extending rearwardly from the housing portion. The fiber optic connector system may also comprise an adapter that includes an adapter body having a port into which the fiber optic connector can be inserted and an adapter latching feature communicating with the port. The adapter also includes at least one sleeve disposed in the port for receiving the at least one ferrule when the fiber optic connector is inserted into the port. The housing portion of the handle can be inserted into the port to position the at least one ferrule in the at least one sleeve and to cause the latch arm on the inner connector body to engage the adapter latching feature on the adapter body. Additionally, the handle can move relative to the inner connector body so that the housing portion can cause the latch arm to disengage the adapter latching feature on the adapter body.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 4 is a perspective view of a portion of the fiber optic connector of FIG. 1, illustrating how an inner connector body of the fiber optic connector is received in a housing portion of a handle.

FIG. 5 is a perspective view of the inner connector body of the fiber optic connector of FIG. 1.

FIG. 6 is a perspective view of a portion of the fiber optic connector of FIG. 1, illustrating an example of how the housing portion of the handle may cooperate with a bottom side of the inner connector body.

FIG. 7 is a perspective view of selected components of the fiber optic connector of FIG. 1 to illustrate how first and second inner springs of the fiber optic connector are positioned by a spring push.

FIG. 9 is a perspective view of the fiber optic connector of FIG. 1 partially inserted into the adapter of FIG. 1.

FIG. 10 is similar to FIG. 9, but illustrates the fiber optic connector fully inserted into the adapter.

DETAILED DESCRIPTION

Figure 1:
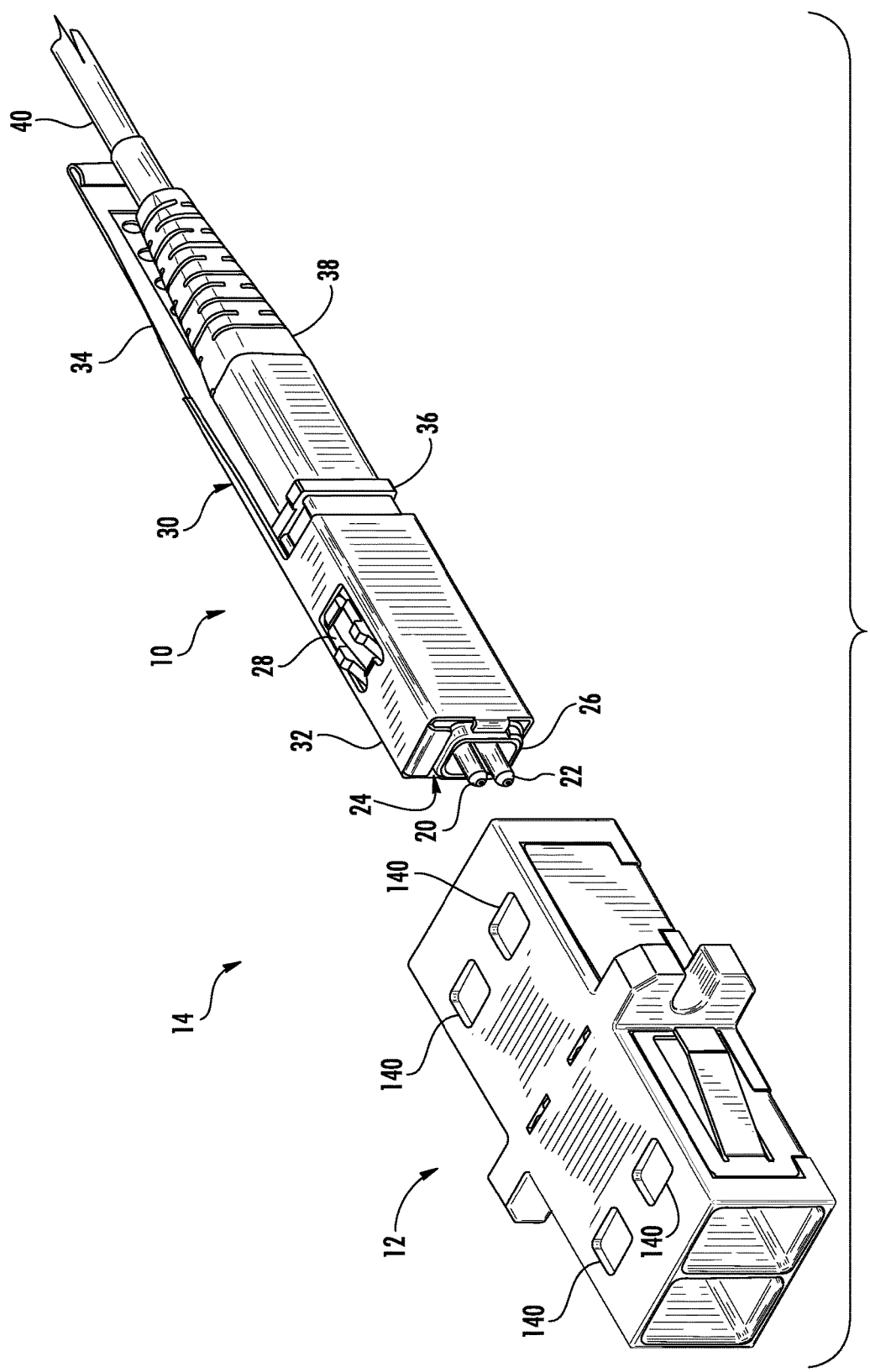
FIG. 1 is a perspective view of one embodiment of a fiber optic connector system that includes a fiber optic connector and an adapter, wherein the fiber optic connector is shown removed from the adapter.

Various embodiments will be further clarified by examples in the description below. To this end, FIG. 1 illustrates one example of a fiber optic connector 10 (also referred to as "optical connector 10", or simply "connector 10") and an adapter 12, which together represent a fiber optic connector system 14 (hereinafter "system 14"). The connector 10 and adapter 12 will each be discussed in further detail below. In general, the connector 10 is designed to have a small profile and thereby enable high-density interconnects. As a result, the connector 10 is particularly suitable for data centers and other environments where many connections are desired in small spaces. The connector 10, adapter 12, and system 14 may even be referred to respectively as the "DC connector," "DC adapter," and "DC connector system."

Still referring to FIG. 1, the connector 10 includes first and second ferrules 20, 22, an inner connector body 24 having a front end 26 from which the first and second ferrules extend, a latch arm 28 extending outwardly from the inner connector body 24, and a handle 30 that cooperates with the inner connector body 24 and latch arm 28. More specifically, the handle 30 includes a housing portion 32 in which the inner connector body 24 is received and a grip portion 34 extending rearwardly from the housing portion 32. As will be described in greater detail below, the handle 30 can move relative to the inner connector body 24 so that the housing portion 32 can cause the latch arm 28 to flex toward the inner connector body 24. The connector 10 also includes an outer connector body 36 coupled to the inner connector body 24 within the housing portion 32 of the handle 30. A boot 38 is coupled to the outer connector body 36 outside of the housing portion 32. The connector 10 is shown as being mounted on a cable 40, thereby forming a cable assembly.

Figure 2:
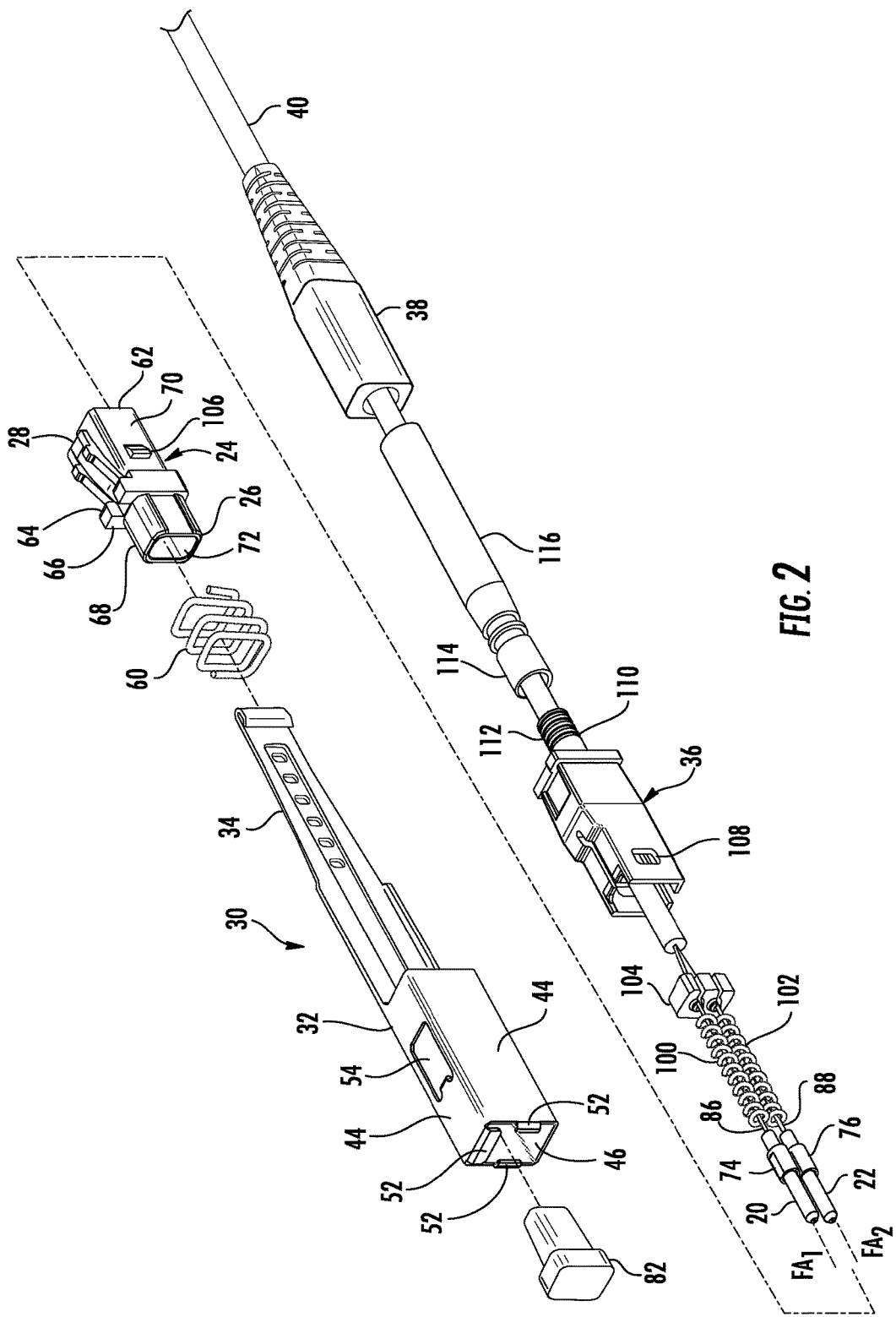
FIG. 2 is an exploded perspective view of the fiber optic connector of FIG. 1.

FIG. 2 is an exploded view of the connector 10 that illustrates the above-mentioned components in further detail, along with components of the connector 10 that cannot be seen in FIG. 1. As shown in FIG. 2, the housing portion 32 of the handle 30 is in the form of a tubular body having a rectangular profile defined by sides 44 that are 90 degrees (or approximately 90 degrees) relative to each other. The sides 44 extend from a front opening 46 to a rear opening (not shown in FIG. 2) of the housing portion 32 so that the housing portion 32 has an internal cavity 50 (FIG. 3) defined by the sides 44. Three of the sides 44 each include a tab 52 located in the front opening 46. Additionally, one of the sides 44 includes an opening 54 for through which the latch arm 28 extends when the inner connector body 24 is received in the housing portion 32 (see FIG. 1).

Unlike the housing portion 32, the grip portion 34 of the handle 30 in the embodiment shown is in the form of a plate-like extension. The grip portion 34 may even extend in a plane parallel (or approximately parallel) to one of the sides 44, effectively acting like an extension of that side in a rearward direction. Indeed, the housing portion 32 and grip portion 34 may be integrally formed as a monolithic structure. For example, the handle 30 may be formed from metal that has been worked or otherwise processed into shape (e.g., punched, stamped, bent, etc.). Alternatively, the handle 30 may be formed from plastic by way of molding. The handle 30 need not even be a monolithic structure if desired, with the housing portion 32 and grip portion 34 formed as separate components that are coupled together.

Still referring to FIG. 2, the connector 10 further includes an outer spring 60 received over a portion of the inner connector body 24 within the housing portion 32 of the handle 30. More specifically, the inner connector body 24 includes a back end 62 opposite the front end 26 and a flange 64 positioned between the front and back ends 26, 62. The flange 64 defines a forward-facing spring seat 66, and a front portion 68 of the inner connector body 24 extends from the spring seat 66 to the front end 26 of the inner connector body 24. The outer spring 60 is received over the front portion 68 when the connector 10 is assembled and is covered by the housing portion 32 of the handle 30. In particular, the outer spring 60 extends between the spring seat 66 of the flange 64 and the tabs 52 on the housing portion 32.

In the example shown, the flange 64 is positioned between not only the front and back ends 26, 62 of the inner connector body 24, but also between the front end 26 and the latch arm 28. This is due to the latch arm 28 extending outwardly from the inner connector body 24 at or behind the flange 64. The latch arm 28 may be integrally formed with the inner connector body 24 (e.g., as a monolithic structure), as shown. The inner connector body 24 also includes a back portion 70 extending from the flange 64 to the back end 62. Although an internal cavity 72 extends within the inner connector body 24 between the front end 26 and back end 62, internal geometry (not shown in FIG. 2) prevents components that hold the first and second ferrules 20, 22 from being inserted through inner connector body 24 when the connector 10 is assembled.

In particular, the first and second ferrules 20, 22 are respectively received in first and second ferrule holders 74, 76 that have larger diameters or widths than the first and second ferrules 20, 22. An internal wall 78 (FIG. 3) within the inner connector body 24 includes openings 80 that accommodate the first and second ferrules 20, 22, but not the first and second ferrule holders 74, 76. Thus, the first and second ferrules 20, 22 can be inserted through the back opening of the inner connector body 24, moved forward in the internal cavity 72, and extended through the openings 80 until the first and second ferrule holders 74, 76 contact the internal wall 78. The first and second ferrules 20, 22 extend beyond the front end 62 of the inner connector body 24 at this point. A dust cap 82 may be inserted into the font end 62 of the inner connector body 24 and received over the first and second ferrule 20, 22 when the connector 10 is not in use.

The first and second ferrules 20, 22 are arranged to extend parallel to each other in a ferrule plane. More specifically, the first and second ferrules 20, 22 include respective first and second longitudinal axes FA1, FA2 along which the first and second ferrules extend 20, 22. The first and second ferrules 20, 22 in the embodiment shown are cylindrical, and the first and second longitudinal axes FA1, FA2 each represent a central axis of the corresponding ferrule. The first and second ferrules 20, 22 are arranged so that the first and second longitudinal axes FA1, FA2 are parallel and thereby define the ferrule plane.

Figure 3:
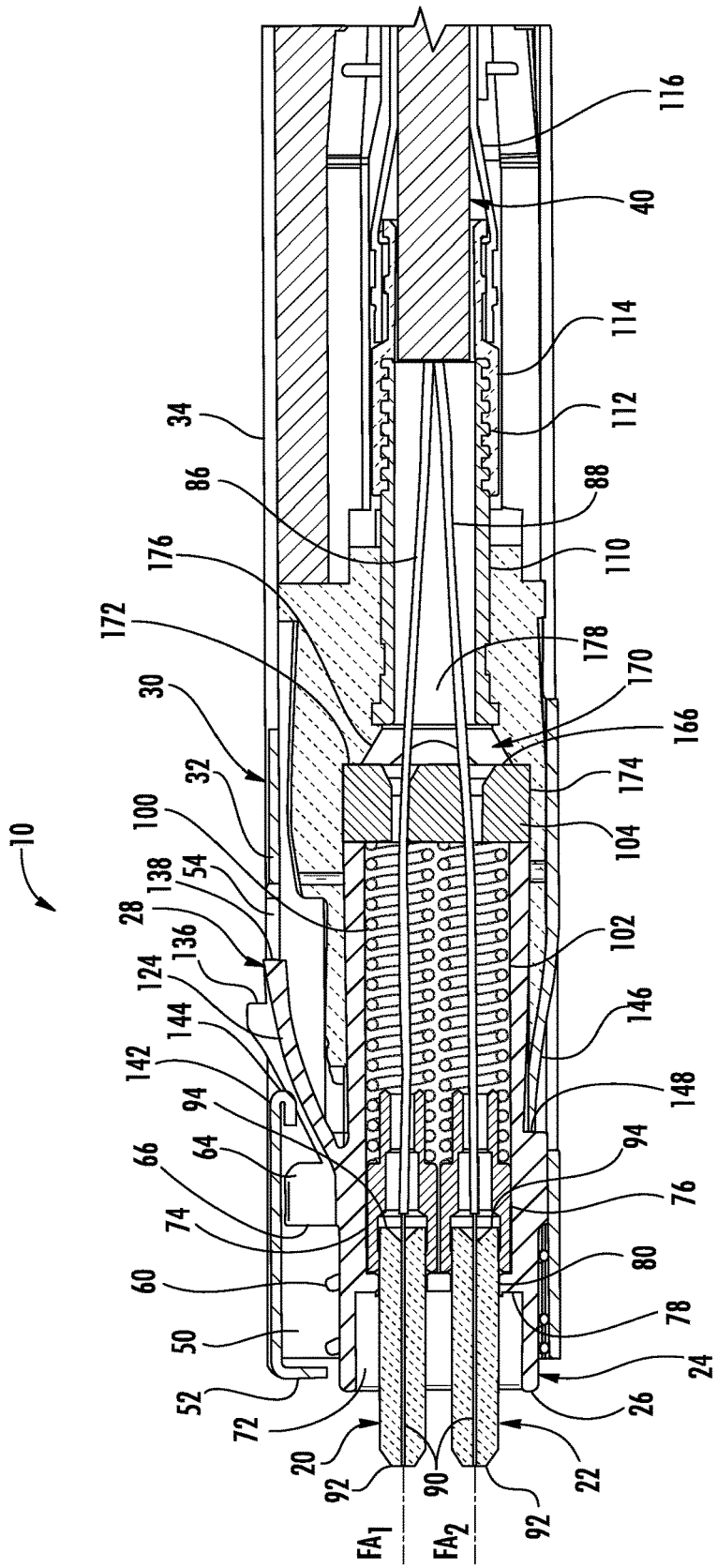
FIG. 3 is a cross-sectional side view of a portion of the fiber optic connector of FIG. 1.

As shown in FIGS. 2 and 3, the cable 40 includes first and second optical fibers 86, 88 extending into bores 90 of the respective first and second ferrules 20, 22. Each bore 90 extends between a front end 92 and back end 94 of the corresponding ferrule and is aligned or approximately aligned (e.g., to within an acceptable tolerance) with the corresponding longitudinal axis ($F_{A1}$ or $F_{A2}$). The first and second optical fibers 86, 88 are secured in the bores 90 using an adhesive.

Still referring to FIGS. 2 and 3, the connector 10 further includes first and second inner springs 100, 102 for biasing the respective first and second ferrules 20, 22 toward the front end 26 of the inner connector body 24. The first and second inner springs 100, 102 each extend between one of the first and second ferrule holders 74, 76 and a spring push 104 that is received in the outer connector body 36 when the connector 10 is assembled. Additional details related to the spring push 104 and assembly of the connector 10 in general will be described in greater detail below. It can be appreciated from FIGS. 2 and 3, however, that the outer connector body 36 being coupled to the inner connector body 24 results in the first and second inner springs 100, 102 extending within the inner connector body 24 and outer connector body 36, biasing the first and second ferrules 20, 22 in a forward direction.

The outer connector body 36 may be coupled to the inner connector body 24 in any suitable manner. In the embodiment shown, the outer connector body 36 is designed to be snapped onto the back portion 70 of the inner connector body 24. Latching features in the form of ramps or shoulders 106 are provided on the back portion 70 of the inner connector body 24. The outer connector body 36 is designed to receive the back portion 70 and includes openings 108 that cooperate with the shoulders 106 to couple the inner connector body 24 to the outer connector body 36. In other words, the outer connector body 36 can be inserted over the back portion 70, flexing as needed to accommodate the shoulders 106, until the shoulders 106 are received in or otherwise engage the openings 108. At this point the outer connector body 36 flexes (e.g., snaps) back towards an un-flexed shape. The shoulders 106 are designed so that the outer connector body 36 cannot easily be pulled back over the shoulders 106 and off the back portion 70 of the inner connector body 24.

FIGS. 2 and 3 illustrate a crimp body 110 extending rearwardly from the outer connector body 36. The crimp body 100 in this example embodiment is a separate component that may be coupled to the outer connector body 36 by any suitable method. For example, the crimp body 110 may be a metal sleeve coupled to the outer connector body 36 by inserting molding techniques. In alternative embodiments, the crimp body 110 may be formed integrally with the outer connector body 36 as a monolithic structure. Although not shown, strength members (e.g., aramid yarn) from the cable 40 may be placed over a grooved portion 112 of the crimp body 110 and secured in place using a crimp band or tube 114. A heat shrink tube 116 is also provided to help further secure the cable 40 to the connector 10. The boot 38 extends over the heat shrink tube 116 and crimp tube 114 to abut the outer connector body 36 when the connector 10 is assembled.

Now that the components of the connector 10 have been introduced, additional details of the inner connector body 24 will be described to better understand how the handle 30 cooperates with the inner connector body 24. To this end, FIG. 4 is an enlarged perspective view showing only the inner connector body 24, and FIG. 5 is an enlarged perspective view of the portion of the assembled connector 10 including the inner connector body 24 and housing portion 32 of the handle 30.

The inner connector body 24 in the embodiment shown is a generally rectangular body and can generally be considered to have four noticeable sides 120 (120a-120d). A rectangular profile is schematically illustrated in FIG. 4 to better illustrate how the inner connector body 24 can be considered to have the four sides 120. Two of the sides 120 (120b, 120d) are generally parallel to the ferrule plane, and two of the sides 120 (120a, 120c) are generally perpendicular to the ferrule plane. The latch arm 28 extends from one of the sides 120 perpendicular to the ferrule plane and itself intersects the ferrule plane.

Various features are provided on the latch arm 28 for cooperating with the handle 30. For example, the latch arm 28 includes a ramp 124 "nestled" or otherwise positioned between first and second latching features 126, 128. A portion of the latch arm 28 defining the ramp 124 extends from the inner connector body 24 in an arcuate manner, thereby providing the ramp 124 with an arcuate shape in the example embodiment shown. More specifically, the latch arm 28 includes a lower side 130 facing the inner connector body 24 and an upper side 132 opposite the lower side 130 (e.g., facing away from the inner connector body 24). A portion of the upper side 132 extends outwardly from the inner connector body 24 in an arcuate manner and defines the ramp 124. Other portions of the upper side 132 extend outwardly from the inner connector body 24 in a generally linear manner to the first and second latching features 126, 128.

The first and second latching 126, 128 features are spaced apart from each other in a transverse direction (i.e., a direction transverse to a longitudinal axis A1). Thus, the ramp 124 is positioned between the first and second latching features 126, 128 in the transverse direction. In a longitudinal direction (i.e., a direction along the longitudinal axis A1), the first and second latching features 126, 128 are spaced further from the inner connector body 24 than at least a portion of the ramp 124. This is due to the latch arm 28 also extending in the longitudinal direction as it extends outwardly from the inner connector body 24.

The first and second latching features 126, 128 in the embodiment shown are in the form of shoulders that define rearward-facing surfaces 136. The shoulders cooperate with openings 140 in the adapter 12 (FIG. 1) to retain the connector 10 in the adapter 12, as will be more apparent after further discussing the adapter below. The latch arm 28 continues to extend beyond the first and second latching features 126, 128. Thus, the latch arm 28 includes a terminal end 138 spaced from the first and second latching features 126, 128. Advantageously, the extension of the latch arm 28 beyond the first and second latching features 126, 128 does not increase the footprint of the inner connector body 24 in a plane perpendicular to the longitudinal axis A1. In particular, the extent to which the latch arm 28 extends outwardly as it extends rearwardly beyond the first and second latching features 126, 128 is limited; in some embodiments there may not even be any further extension outwardly. The latch arm 28 is therefore shaped such that the first and second latching features 126, 128 (or at least portions thereof) are spaced further from the inner connector body 24 than the terminal end 138.

Although two shoulders are provided as the first and second latching features 126, 128 in the embodiment shown, in alternative embodiments there may be a single latching feature or more than two latching features included on the latch arm. Furthermore, the latching features 128 may be formed as structures other than shoulders, as the exact form will depend on the corresponding latching features 140 of the adapter 12.

As shown in FIG. 5, and as mentioned above, the housing portion 32 of the handle 30 includes an opening 54 for through which the latch arm 28 extends when the connector 10 is assembled. The housing portion 32 also includes a pushing feature 142 adjacent the opening 54 for contacting the latch arm 24. In the embodiment shown, the pushing feature 142 is in the form of a finger extending into the opening 54. The finger is bent back to define a rounded surface 144, as best seen in FIG. 3. When the handle 30 is moved rearwardly relative to the inner connector body 24, the rounded surface 144 contacts and slides along the ramp 124 to cause the latch arm 28 to flex toward the inner connector body 24. In alternative embodiments, the pushing feature 142 may be a different type of projection with a rounded surface, or may not include any rounded surface, yet still be capable of contacting the latch arm 28 and causing the latch arm 28 to flex toward the inner connector body 24.

There is a limit to how much the handle 30 can move rearwardly relative to the inner connector body 24. In particular, the outer spring 60 is compressed between the tabs 52 and the flange 64 during such movement. Eventually the outer spring 60 cannot be compressed any further and thereby prevents further movement of the handle 30 in the rearward direction. At this point, the rounded surface 144 of the pushing feature 142 remains in contact with the ramp 124. In other words, the connector 10 is designed so that pushing feature 142 does not extend past the terminal end 138 of the latch arm 28 when the handle 30 has reached a rearward limit of its movement relative to the inner connector body 24. Such a design helps prevent the latch arm 28 from catching or otherwise blocking the handle 30 from moving back toward an initial position. For example, the terminal end 138 of the latch arm 28 does not engage the pushing feature 142 in a manner that might prevent the handle 30 moving forwardly relative to the inner connector body 24. Instead, the pushing feature 142 is able to slide back down the ramp 124 and allow such forward movement.

The outer spring 60 may apply a biasing force that causes the forward movement of the handle 30. The forward movement may be limited in a variety ways. In the embodiment shown, the housing portion 32 further includes a stop feature in the form of a finger 146 on the side 44 opposite the opening 54. This can be better appreciated with reference to both FIGS. 3 and 6. The finger 146 extends in a forward direction and inwardly toward the inner connector body 24. Additionally, the finger 146 is positioned rearward of the flange 64 on the inner connector body 24. When the handle 30 is moved forwardly relative to the inner connector body 24, eventually a terminal end 148 of the finger 146 contacts the flange 64 to prevent further forward movement of the handle 30. In alternative embodiments, the stop member may be a structure other than a finger. Additionally, although the finger 146 in the embodiment shown cooperates with the flange 64 on the side 120 (FIG. 4) of the inner connector body 24 that is opposite the latch arm 28, in other embodiments, a stop member that limits forward movement of the handle 30 may be provide elsewhere on the housing portion 32 so as to cooperate with a different side 120 of the inner connector body 24.

Referring back to FIG. 4, two of the sides 120 (120b, 120d) of the inner connector body 24 each include a guide channel 152 extending along a length of the front portion 68. The guide channels 152 extend between the front end 26 and the flange 64. When the connector 10 is assembled, and as shown in FIG. 5, two of the tabs 52 on the housing portion 32 are received in the guide channels 152. The tabs 52 travel along the guide channels 152 when the handle 30 moves relative to the inner connector body 24.

In the embodiment shown, the tabs 52 are in the form of lips or plate-like extensions from the sides 44 into the front opening 46 of the housing portion 32. In alternative embodiments, the housing portion 32 may include other forms of projections received in the guide channels 152 and/or contacting the inner connector body 24. The projections in such embodiments may cooperate with the outer spring 60 in a manner similar to that described above with respect to the tabs 52. That is, the projections may help retain the outer spring 60 on the inner connector body 24, effectively providing a spring seat so that the outer spring 60 is able to bias the handle 30 relative to the inner connector body 24.

Now referring to FIGS. 3 and 7, additional details relating to the spring push 104 will be described. In FIG. 7, only selected components of the connector 10 are illustrated to facilitate understanding. The spring push 104 includes first and second slots 156, 158 for accommodating the first and second optical fibers 86, 88. The first and second slots 156, 158 extend from the same side of the spring push 104 such that the spring push 104 has an E-shaped configuration. The spring push 104 is also a generally rectangular body in the embodiment shown, making the E-shaped configuration especially apparent.

A front side 160 of the spring push 104 defines first and second spring seats 162, 164 for positioning the respective first and second inner springs 100, 102. In particular, a forward-facing surface of the spring push includes first and second bumps 162, 164. The first and second slots 156, 158 extend into the first and second bumps 162, 164 such that the first and second optical fibers 86, 88 can extend through the first and second bumps 162, 164. Respective ends of the first and second inner springs 100, 102 are received over the first and second bumps 162, 164 so that the ends are maintained in position on the spring push 104. As can be appreciated, such an arrangement helps prevent the first and second inner springs 100, 102 from moving laterally on the spring push 104 and contacting the first and second optical fibers 86, 88.

In other embodiments, the front side 160 of the spring push 104 may include recesses or other structures to define the first and second spring seats.

As shown in FIG. 3, the outer connector body 36 includes an internal cavity 170 that receives the spring push 104 when the connector 10 is assembled. The internal cavity 170 is shaped so that a rearward-facing surface 166 of the spring push 104 contacts an inner wall 172 of the outer connector body 36. More specifically, the internal cavity 170 comprises a passageway though the outer connector body 36. A first section 174 of the passageway accommodates the spring push 104, and then steps down in diameter to define the inner wall 172. From this point, a transition section 176 of the passageway transitions to a second section 178 that has a smaller diameter than the first section 174.

The first and second slots 156, 158 of the spring push 104 can be kept relatively small to help position the first and second optical fibers 86, 88 on or close to the longitudinal axes $F_{A1}$, $F_{A2}$ of the first and second ferrules 20, 22. Furthermore, because of the first and second slots 156, 158, the spring push 104 can be positioned onto the first and second optical fibers 86, 88 after installing the first and second ferrules 20, 22. Indeed, this is one aspect that facilitates assembling the connector 10 after forming sub-assemblies with the first and second ferrules 20, 22 and first and second optical fibers 86, 88. An assembly process may, for example, involve placing the boot 38, heat shrink tube 116, crimp tube 114, and outer connector body 36 onto the cable 40. The end of the cable 40 may then be prepared to form the cable assembly. This may include stripping coating(s) from specified lengths of the first and second optical fibers 86, 88, cutting strength members (e.g., aramid yarn) of the cable 40 to a desired length, etc.

At this point, the first and second inner springs 100, 102 may be placed over the first and second optical fibers 86, 88, which may then be inserted into and secured to the first and second ferrules 20, 22. The first and second ferrule holders 74, 76 may already be secured to the first and second ferrules 20, 22 at this point. After forming cable sub-assemblies by securing the first and second optical fibers 86, 88 within the first and second ferrules 20, 22, the first and second ferrules 20, 22 may be polished or otherwise processed. Because the inner connector body 24 and handle 30 have not yet been installed, the first and second ferrules 20, 22 can be accessed and handled with greater ease compared to when the connector 10 is fully assembled.

One the first and second ferrules 20, 22 have been installed, the spring push 104 may be positioned onto the first and second optical fibers 86, 88 at a location behind the first and second inner springs 100, 102. The first and second slots 156, 158 of the spring push 104 accommodate the first and second optical fibers 86, 88, as noted above. The outer connector body 36 may then be moved forward over the spring push 104 and coupled to inner connector body 24, which is installed onto the cable 40 from the other direction. At this point, the spring push 104 abuts the inner wall 172 of the outer connector body 36, the first and second inner springs 100, 102 bias the first and second ferrule holders 74, 76 against the internal wall 78 of the inner connector body 24, and the front ends 90 of the first and second ferrules 20, 22 extend past the front end 26 of the inner connector body 24.

Finally, the cable 40 may be secured to the outer connector body 36. Strength members (e.g., aramid yarn) from the cable 40 may be crimped or otherwise secured to the crimp body 110 using the crimp tube 114, as mentioned above. The heat shrink tube 116 may be applied over the crimp tube 114 and a portion of the cable 40, and the boot 38 may be moved forward over the heat shrink tube 116 to abut the outer connector body 36.

Figure 8:
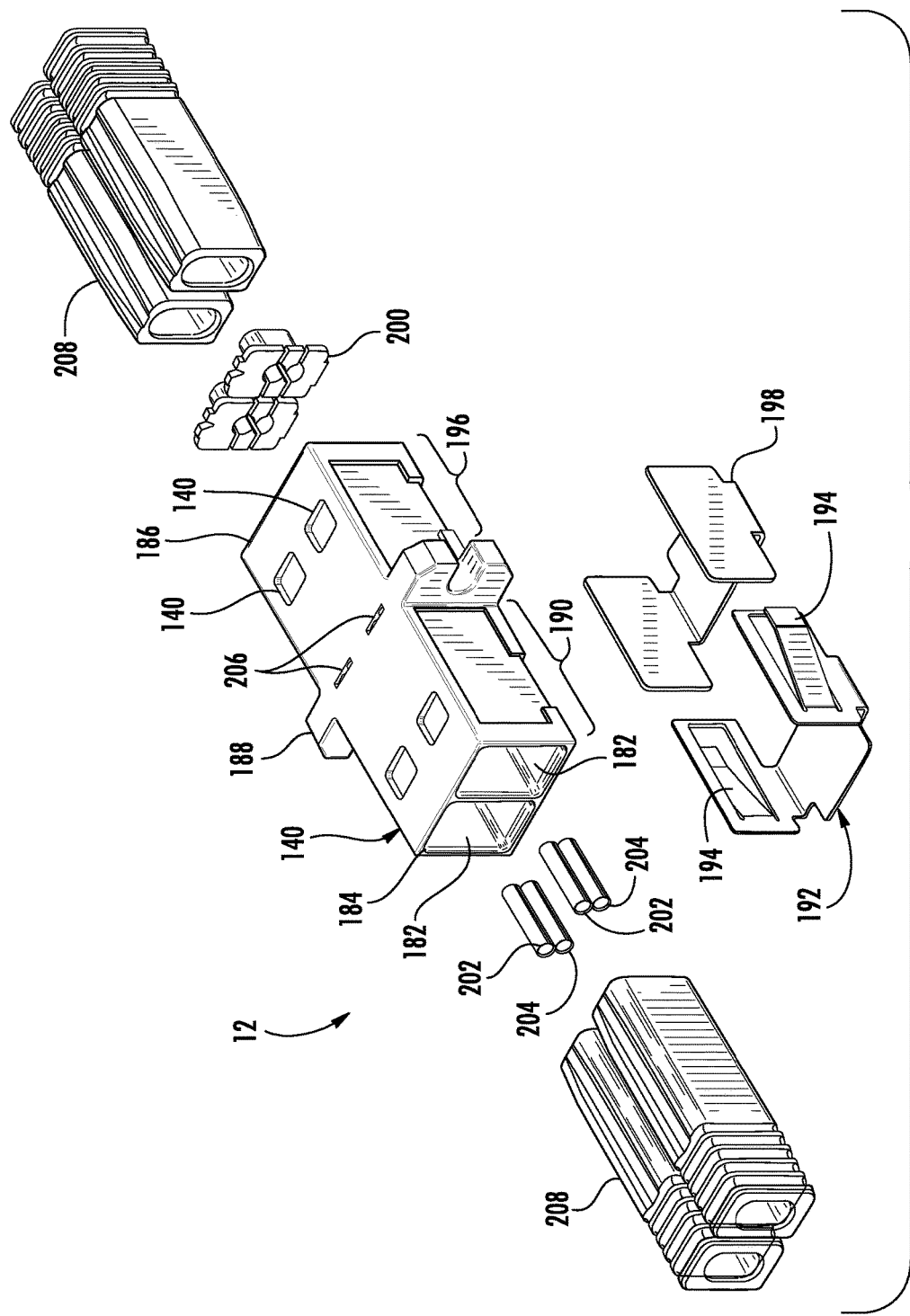
FIG. 8 is an exploded perspective view of the adapter of FIG. 1.

As mentioned above, the connector 10 may be part of a system 14 that also includes the adapter 12. FIG. 8 is an exploded perspective view of an example embodiment of the adapter 12. As shown in FIG. 8, the adapter 12 includes an adapter body 180 defining ports 182 (also referred to as "receptacles") into which the connector 10 can be inserted and at least one latching feature 140 (e.g., an opening) associated with each of the ports 182. Two ports 182 are defined in the embodiment shown—first and second ports arranged side-by-side (i.e., adjacent to each other). In alternative embodiments, the adapter body 180 may define a single port or more than two ports (e.g., 4 ports, 6 ports, 8 ports, etc.), which may be arranged side-by-side and/or stacked on top of each other. For example, the adapter body 180 may define two or more rows of two or more ports, with the ports of one row being arranged under the ports of another row so as to be arranged in columns.

The ports 182 define generally hollow passageways extending between first and second ends 184, 186 of the adapter body 180. Each port 182 has a shape that generally corresponds to the housing portion 32 of the handle 30. Thus, for the example embodiment shown, each port 182 generally has a rectangular configuration. Additionally, the adapter body itself has a rectangular configuration, but includes a flange 188 between the first and second ends 184, 186. The flange 188 may be located approximately halfway between the first and second ends 184, 186. A first portion 190 of the adapter body 180 that is between the first end 184 and the flange 188 is configured to receive a mount plate or clip 192. In the embodiment shown, the mount plate 192 is a generally U-shaped component configured to be received on the first portion 190. The mount plate 192 includes arms 194 that, together with the flange 188, may be used secure the adapter 12 to a panel, faceplate, or other wall that includes openings for the adapter body 180.

A second portion 196 of the adapter body 182 that is between the flange 188 and second end 186 is configured to receive a reinforcement plate or clip 198. Like the mount plate 192, the reinforcement plate 198 in the embodiment shown is a generally U-shaped component configured to be received on the second portion 196. But unlike the mount plate 192, the reinforcement plate 198 does not include the arms 194. Such arms may not be needed because the second portion 196 may be external to the hardware or other structure two which the adapter is mounted (e.g., the structure including the panel, faceplate, wall, etc. mentioned above). The adapter body 182 may be generally symmetrical such that a mount plate 192 may be received on the second portion 196 and a reinforcement plate 196 may be received on the first portion 190, if desired.

Still referring to FIG. 8, the adapter 12 further includes at least one sleeve holder 200 configured to position first and second sleeves 202, 204 in each of the ports 182. Two sleeve holders 200 are provided in the embodiment shown, one for each of the ports 182. Each sleeve holder 200 may be inserted into the corresponding port 182 and then snapped or otherwise secured in place in the adapter body 180. Slots 206 for receiving portions of the sleeve holders 200 are provided in the adapter body 180 for this purpose. The slots 206 are generally located half way between the first and second ends 184, 186, similar to the flange 188. The first and second sleeves 202, 204 that are positioned by the sleeve holders 200 are used to align the first and second ferrules 20, 22 of the connector 10 with similarly-shaped ferrules of a mating component (e.g., another connector), as will be apparent based on the description below. When the ports 182 are not being used to mate components, dust caps 208 may be inserted into the ports to prevent contaminants (e.g., dust and debris) from migrating into the first and second sleeves 202, 204.

FIGS. 9 and 10 illustrate how the connector 10 can cooperate with the adapter 12. In general, an individual may use the handle 30 to insert the connector 10 into one of the ports 182 of the adapter 12. During the insertion, the latch arm 28 contacts the adapter body 180, as shown in FIG. 9. The latch arm 28 then flexes toward the inner connector body 24 to allow further insertion of the housing portion 32 of the handle 30 and the inner connector body 24 into the port 182. Ultimately the first and second sleeves 202, 204 within the port 182 receive the first and second ferrules 20, 2, that extend from the inner connector body 24. Additionally, the first and second latching features 126, 128 on the latch arm 28 engage the latching feature 140 on the adapter body 180 that is associated with the port 182, as shown in FIG. 10. In the embodiment shown, the latching features 140 are openings that accommodate the latching features 126, 128. The latch arm 28 flexes away from the inner connector body 24 when the latching features 124, 126 are aligned with the openings 140. The rearward-facing surfaces 136 defined by the first and second latching features 126, 128 are then in a position to engage the adapter body 180 to help retain the connector 10 in the port 182.

In FIGS. 9 and 10, the connector 10 is shown as being inserted into one of the ports 182 from the second end 186 of the adapter body 180. As can be appreciated, a similar connector may be inserted into the port 182 from the first end 184 of the adapter body 180. The first and second sleeves 202, 204 within the port 182 are used to align the ferrules of the two connectors to help establish an optical connection between the optical fibers held by the ferrules.

To remove the connector 10 from the adapter 12, the process is reversed. An individual may once again use the handle 30. When the handle 30 is pulled rearwardly, the pushing feature 142 on the housing portion 32 contacts and slides along the ramp 124 of the latch arm 128. This results in the housing portion 32 causing the latch arm 28 to flex back toward the inner connector body 24, which in turn causes the first and second latching features 124, 126 to disengage the latching feature 140 on the adapter body 180. Thus, the rearward-facing surfaces 136 of the first and second latching features 126, 128 are no longer positioned to engage the adapter body 180 such that the connector 10 can be pulled back out of the port 182.

As can be appreciated, the handle 30 cooperates with the inner connector body 24 in a unique manner and can be used to both insert and remove the connector 10 from one of the ports 182. Because the inner connector body 24 need not be manipulated by hand, the connector 10 can be designed with a small profile to enable high-density interconnects. As an example, the first and second ferrules 20, 22 may each have a diameter of 1.25 mm, similar to the ferrules of LC connectors. The ports 182, however, may have a size that does not exceed 8 mm in height and 5.3 mm in width. This also means that the housing portion 32 of the handle 30 and the inner connector body 24 (but for the latch arm 28) also have sizes within these dimensions, which generally correspond to the port size for a conventional LC adapter. Thus, the connector 10 can effectively double the density of interconnects compared to conventional LC connectors, providing two 1.25 mm-diameter ferrules in the same space as an LC connector with one 1.25 mm-diameter ferrule.

As a more specific example, consider a 2-port embodiment of the adapter 12, as shown in FIGS. 1 and 8-10. The adapter body 180 may be sized to fit within the openings ("cutouts") of existing faceplates, panels, etc. for conventional LC duplex adapters. However, the system 14 enables twice as many optical interconnects (4 total; 2 from each connector inserted into the ports) compared to a conventional LC duplex connector system (which has 2 total optical interconnects; 1 from each LC connector sub-assembly in the LC duplex connector). The system 14 effectively has half the footprint size of LC connector systems and, therefore, can be used to double the density of optical interconnects compared to LC connector systems.

Figure 11:
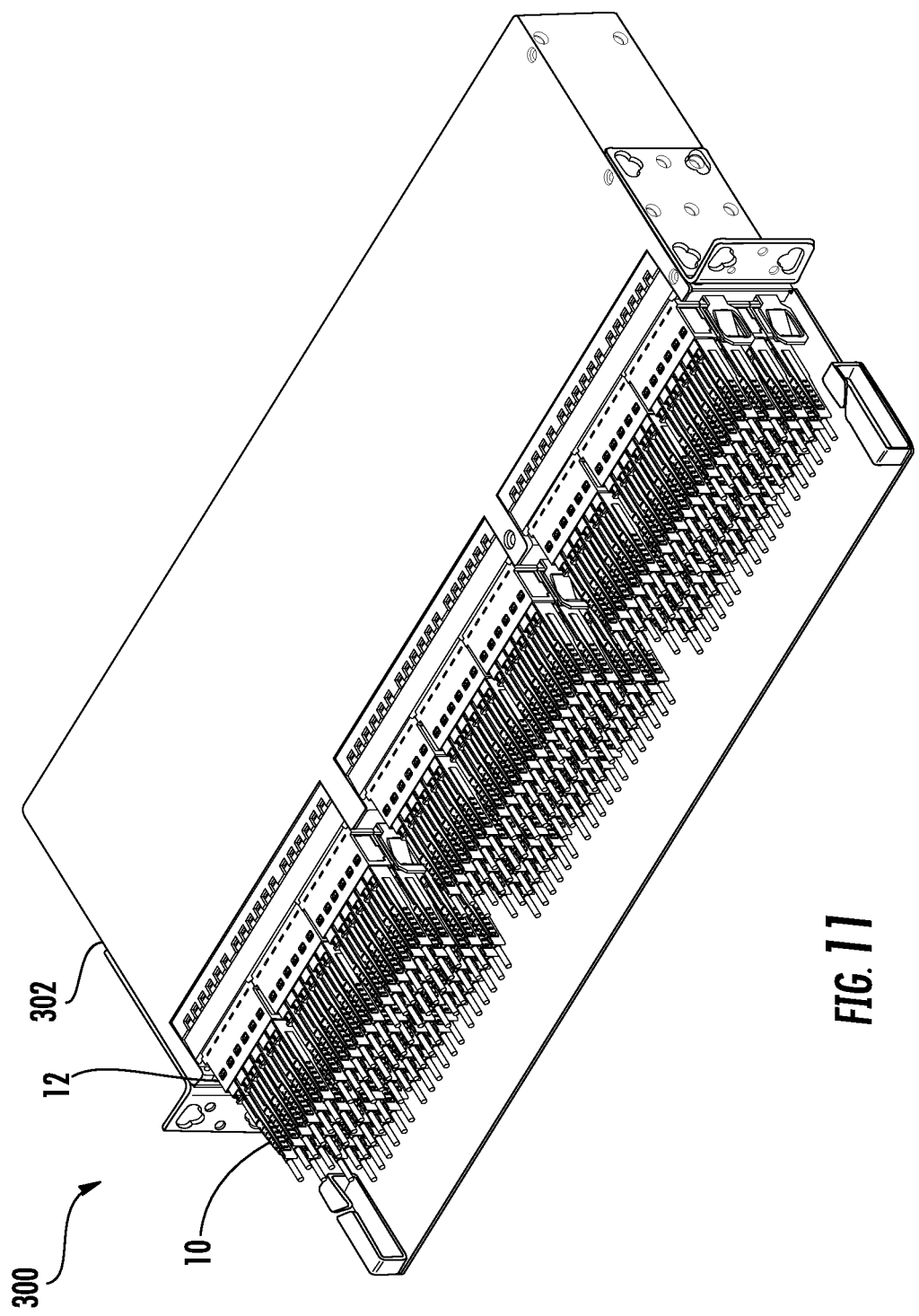
FIG. 11 is a perspective view of an example hardware solution incorporating the fiber optic connector system of FIG. 1 to provide a high-density interconnect.

FIG. 11 illustrates an example of a high-density interconnect 300 enabled by the system 14. The adapters 12 are mounted to an equipment rack 302, which may have conventional dimensions of 19″ (482.60 mm) in width and 1.752 inches (44.50 mm) in height. In FIG. 11, each of the adapters 12 has a 6-port configuration. The adapters 12 are arranged as four rows of nine adapters, resulting in 432 ports (and, therefore, 432 potential optical interconnects; 2 per port×6 per adapter×9 adapters per row×4 rows of adapters). In other words, there are 432 ports within one rack unit (i.e., "1 U").

Figure 12:
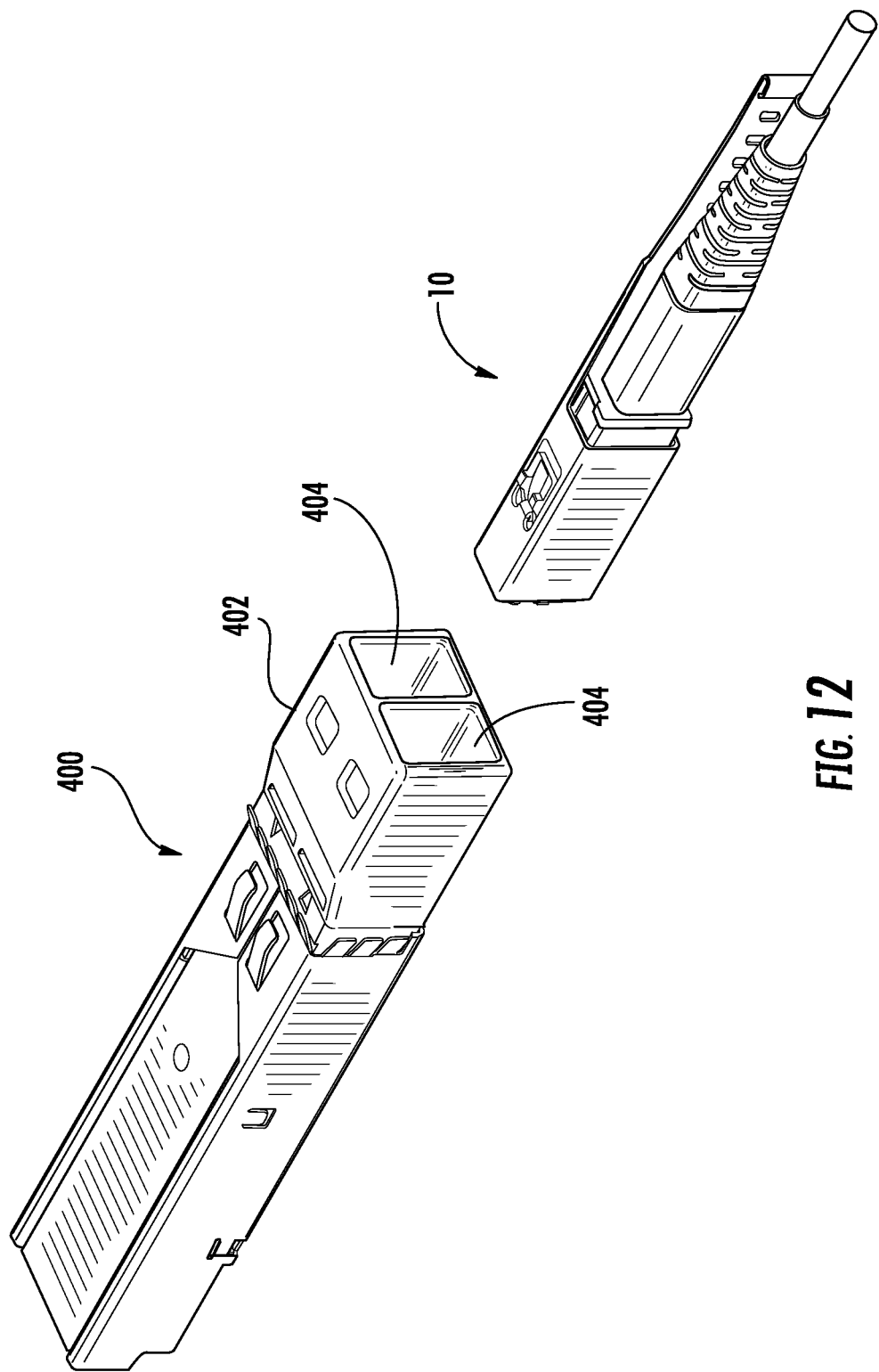
FIG. 12 is a perspective view of the fiber optic connector of FIG. 1 removed from a transceiver module.
Figure 13:
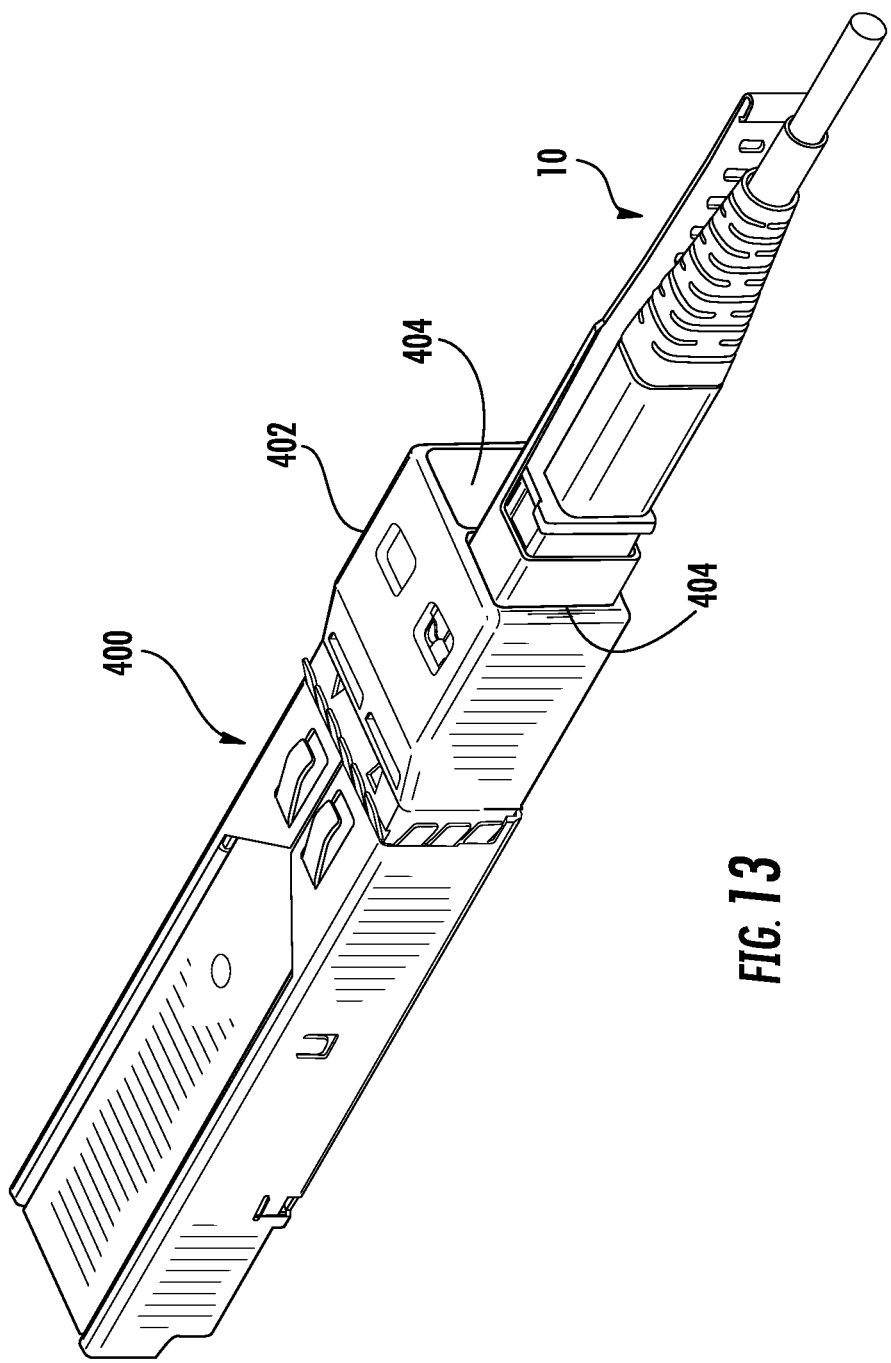
FIG. 13 is similar to FIG. 12, but illustrates the fiber optic connector fully inserted into the transceiver module.

Although the system 14 is described above as including adapters designed for panels or the like, the connector 10 may also be used with transceiver modules. FIGS. 12 and 13, for example, illustrate the connector 10 being inserted into a transceiver module 400. The transceiver module 400 includes an adapter 402 that defines first and second ports 404 like the adapter 12 (i.e., the ports 404 correspond to the ports 182). Additionally, the connector 10 can cooperate with the adapter 402 in a manner similar to how it cooperates with the adapter 12. That is, the connector 10 can be inserted into and removed from the adapter 402 of the transceiver module 400 in a manner similar to that described above for the adapter 12 (see discussion of FIGS. 9 and 10 above). The transceiver module 400 for the connector 10 may also be considered part of the system 14.

Figure 14:
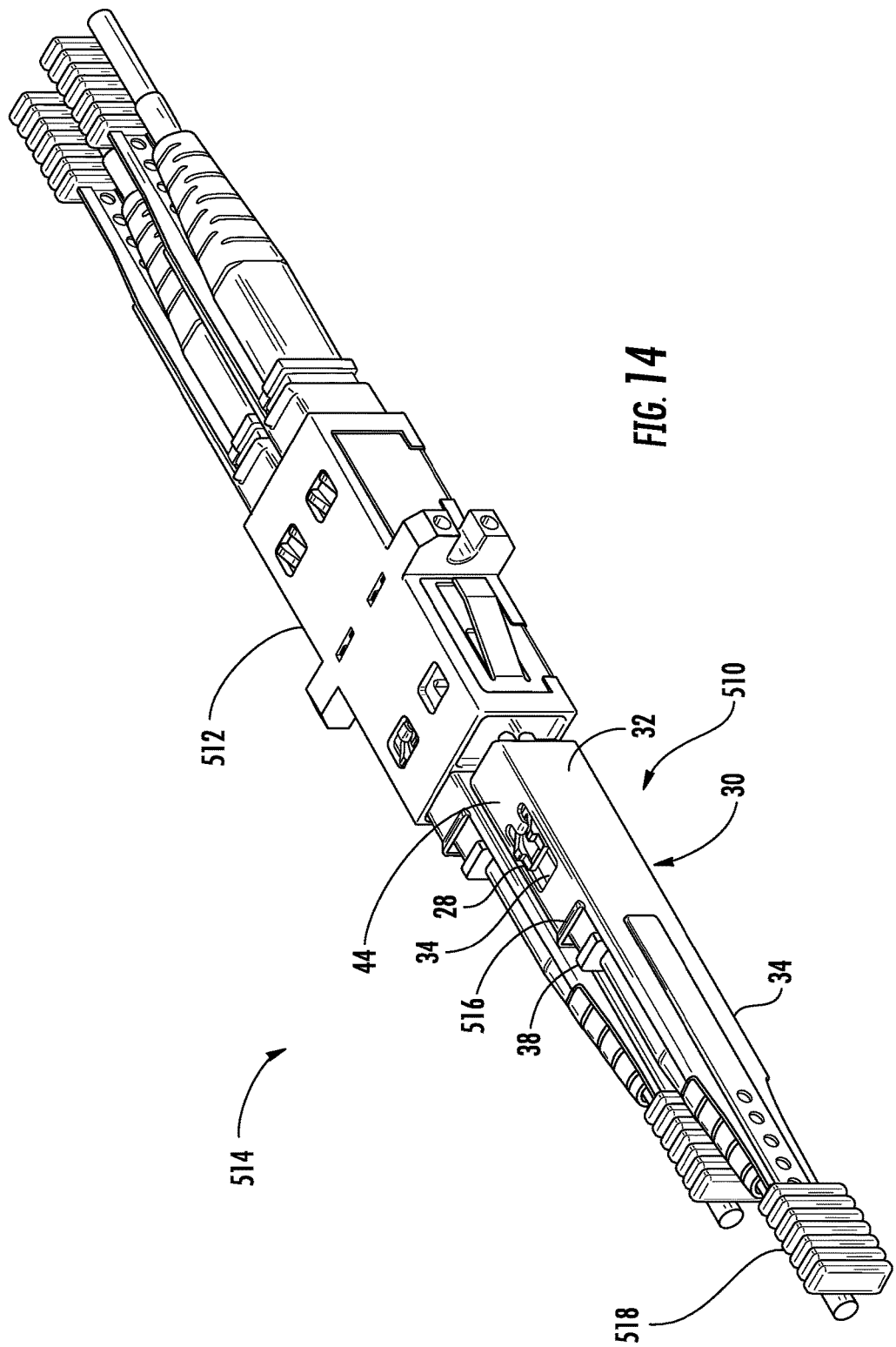
FIG. 14 is a perspective view of another embodiment of a fiber optic connector system that includes a fiber optic connector and an adapter.

Those skilled in the art will appreciate that other modifications and variations can be made without departing from the spirit or scope of the invention defined by the claims below. For example, FIG. 14 illustrates a fiber optic connector system 514 that includes a fiber optic connector 510 ("connector 510") and an adapter 512. The connector 510 and adapter 512 are generally similar to the connector 10 and adapter 12, and similar reference numbers are used to refer to corresponding elements. In the embodiment shown in FIG. 14, the handle 30 includes several modifications. First, the housing portion 32 includes a ledge 516 at the back end of the housing portion 30, on at least the side 44 with the opening 54. The ledge 516 may facilitate an individual using the housing portion 32 to push and pull the connector 10 from the adapter 512 (e.g., if the individual chooses not to use the grip portion 34). Additionally, the grip portion 34 includes a block or knob 518 that makes the grip portion 34 easier to grasp and, therefore, facilitates use of the handle 30.

Other modifications, combinations, sub-combinations, and variations of the disclosed embodiments will be appreciated by persons skilled in the art based on this disclosure.

What is claimed is:

1. A fiber optic connector, comprising:
first and second ferrules each configured to support at least one optical fiber and arranged to extend parallel to each other in a ferrule plane;
an inner connector body having a front end from which the first and second ferrules extend and a back end opposite the front end;
a latch arm extending outwardly from the inner connector body and intersecting the ferrule plane;
a handle having a housing portion in which the inner connector body is at least partially received and a grip portion extending rearwardly from the housing portion, wherein:
the housing portion of the handle is in the form of a tubular body with sides that extend from a front opening of the housing portion to a rear opening of the housing portion;
one of the sides of the housing portion includes an opening through which the latch arm extends; and
the handle can move relative to the inner connector body so that the housing portion can cause the latch arm to flex toward the inner connector body;
an outer connector body coupled to the back end of the inner connector body;
first and second inner springs extending within the inner connector body and outer connector body, wherein the first and second inner springs bias the respective first and second ferrules ferrule toward the front end of the inner connector body; and
a spring push received in the outer connector body, wherein the spring push includes first and second slots for accommodating the respective at least one optical fiber that the first and second ferrules are configured to support, and wherein the spring push defines first and second spring seats for positioning the first and second inner springs in the outer connector body.

2. The fiber optic connector of claim 1, wherein the housing portion of the handle includes a pushing feature adjacent the opening through which the latch arm extends for contacting the latch arm to cause the latch arm flex toward the inner connector body.

3. The fiber optic connector of claim 2, wherein the latch arm includes a ramp that the pushing feature can slide along to cause the latch arm to flex toward the inner connector body.

4. The fiber optic connector of claim 3, wherein the ramp has an arcuate shape.

5. The fiber optic connector of claim 3, wherein the pushing feature comprises a projection with a rounded surface for contacting the ramp on the latch arm.

6. The fiber optic connector of claim 5, wherein the pushing feature comprises a finger that is bent to define the rounded surface.

7. The fiber optic connector of claim 2, wherein:
the latch arm includes at least one latching feature spaced further from the inner connector body than at least a portion of the ramp;
the latch arm also includes a lower side facing the inner connector body and an upper side opposite the lower side;
a first portion of the upper side extends outwardly from the inner connector body in an arcuate manner and defines the ramp; and
a second portion of the upper side extends outwardly from the inner connector body to the at least one latching feature in a generally linear manner.

8. The fiber optic connector of claim 2, wherein:
the inner connector body extends along a longitudinal axis;

the latch arm includes first and second latching features spaced apart from each other in a direction transverse to the longitudinal axis; and the ramp is positioned between the first and second latching features.

9. The fiber optic connector of claim 1, wherein:

the latch arm further at least one latching feature and a terminal end spaced from the at least one latching feature;

the terminal end and the at least one latching feature having respective positions relative to the inner connector body; and the latch arm is shaped so that the position of the at least one latching feature is further from the inner connector body than the position of terminal end.

10. The fiber optic connector of claim 9, wherein the at least one latching feature comprises at least one rearwardly-facing shoulder.

11. The fiber optic connector of claim 1, wherein:

the inner connector body includes at least one guide channel extending along a length of the inner connector body; and the housing portion of the handle includes at least one projection received in the at least one guide channel.

12. The fiber optic connector of claim 11, wherein:

the housing portion of the handle includes a front opening through which the first and second ferrules extend; and the at least one projection on the housing portion comprises at least one tab located at the front opening.

13. The fiber optic connector of claim 1, wherein:

the inner connector body includes a flange positioned between the front end of the inner connector body and the latch arm;

the housing portion of the handle includes at least one stop member extending toward the inner connector body; and the at least stop member is configured to cooperate with the flange to limit forward movement of the handle relative to the inner connector body.

14. The fiber optic connector of claim 13, wherein:

the at least one stop member is configured to cooperate with the flange on a side of the inner connector body that is opposite the latch arm.

15. The fiber optic connector of claim 13, wherein:

the at least one stop member comprises a finger extending toward the inner connector body.

16. The fiber optic connector of claim 1, wherein the housing portion of the handle surrounds the inner connector body.

17. The fiber optic connector of claim 1, wherein the inner connector body and first and second ferrules extend through the front opening of the handle.

18. The fiber optic connector of claim 1, wherein the spring push includes a forward-facing surface and first and second bumps on the forward-facing surface that define the first and second spring seats.

19. The fiber optic connector of claim 1, wherein the spring push has an E-shaped configuration.

20. A fiber optic connector, comprising:

at least one ferrule configured to support at least one optical fiber;

an inner connector body having a front end from which the at least one ferrule extends, a back end opposite the front end, and a flange positioned between the front end and the back end, wherein the flange defines a forward-facing spring seat, and wherein a front portion of the inner connector body extends from the forward-facing spring seat to the front end of the inner connector body;

a latch arm extending outwardly from the inner connector body;

a handle having a housing portion in which the inner connector body is at least partially received and a grip portion extending rearwardly from the housing portion; and an outer spring received over the front portion of the inner connector body within the housing portion of the handle;

wherein:

the handle can move relative to the inner connector body between a forward position in which the housing portion does not flex the latch arm and a rearward position in which the housing portion flexes the latch arm toward the inner connector body; and the outer spring biases the housing portion of the handle toward the forward position.

21. The fiber optic connector of claim 20, wherein:

the flange of the inner connector body is positioned between the front end of the inner connector body and the latch arm;

the housing portion of the handle includes at least one projection extending toward the inner connector body; and the outer spring extends between the at least one projection of the handle and the flange of the inner connector body.

22. A cable assembly, comprising:

a fiber optic cable including first and second optical fibers; and a fiber optic connector mounted on the fiber optic cable, the fiber optic connector including:

first and second ferrules supporting the first and second optical fibers of the fiber optic cable and arranged to extend parallel to each other in a ferrule plane;

an inner connector body having a front end from which the first and second ferrules extend and a lack end opposite the front end;

a latch arm extending outwardly from the inner connector body and intersecting the ferrule plane; and a handle having a housing portion in which the inner connector body is at least partially received and a grip portion extending rearwardly from the housing portion, wherein the handle can move relative to the inner connector body so that the housing portion can cause the latch arm to flex toward the inner connector body;

an outer connector body coupled to the back end of the inner connector body;

first and second inner springs extending within the inner connector body and outer connector body, wherein the first and second inner springs bias the respective first and second ferrules ferrule toward the front end of the inner connector body; and a spring push received in the outer connector body, wherein the spring push includes first and second slots for accommodating the respective at least one optical fiber that the first and second ferrules are configured to support, and wherein the spring push defines first and second spring seats for positioning the first and second inner springs in the outer connector body.

23. A fiber optic connector system, comprising:
a fiber optic connector including:
- at least one ferrule configured to support at least one optical fiber;
- an inner connector body having a front end from which the at least one ferrule extends, a back end opposite the front end, and a flange positioned between the front end and the back end, wherein the flange defines a forward-facing spring seat, and wherein a front portion of the inner connector body extends from the forward-facing spring seat to the front end of the inner connector body;
- a latch arm extending outwardly from the inner connector body; and
- a handle having a housing portion in which the inner connector body is at least partially received and a grip portion extending rearwardly from the housing portion;
- an outer spring received over the front portion of the inner connector body within the housing portion of the handle, wherein:
  - the handle can move relative to the inner connector body between a forward position in which the housing portion does not flex the latch arm and a rearward position in which the housing portion flexes the latch arm toward the inner connector body; and
  - the outer spring biases the housing portion of the toward the forward position; and an adapter including:
- an adapter body defining a port into which the fiber optic connector can be inserted and an adapter latching feature communicating with the port; and
- at least one sleeve disposed in the port for receiving the at least one ferrule when the fiber optic connector is inserted into the port;

wherein:
- the housing portion of the handle of the fiber optic connector is configured to be received in the port; and
- the latch arm on the inner connector body of the fiber optic connector is configured to engage the adapter latching feature to retain the fiber optic connector in the port.

24. The fiber optic connector system of claim 23, wherein:
- the housing portion of the handle can be inserted into the port to position the at least one ferrule in the at least one sleeve and to cause the latch arm on the inner connector body to engage the adapter latching feature on the adapter body; and
- movement of the handle relative to the inner connector body that causes the housing portion to flex the latch arm toward the inner connector body also causes the latch arm disengage the adapter latching feature on the adapter body.

25. The fiber optic connector system of claim 24, wherein the adapter latching feature comprises an opening in the adapter body communicating with the port.

26. The fiber optic connector system of claim 24, wherein:
- the at least one ferrule of the fiber optic connector comprises first and second ferrules each configured to support at least one optical fiber;
- the adapter body defines a plurality of the ports and includes a plurality of the adapter latching features each communicating with one of the ports; and
- each of the ports includes first and second sleeves such that the fiber optic connector can be inserted to any of the ports.

* * * * *

UNITED STATES PATENT AND TRADEMARK OFFICE
CERTIFICATE OF CORRECTION

PATENT NO. : 10,191,227 B2
APPLICATION NO. : 15/435449
DATED : January 29, 2019
INVENTOR(S) : Jhih-Ping Lee It is certified that error appears in the above-identified patent and that said Letters Patent is hereby corrected as shown below:

On the Title Page

In Column 2, item (56), Other Publications, Lines 1-2, delete "PCT/US2016/0137903," and insert -- PCT/US2016/067903, --, therefor.

In the Claims

In Column 16, Line 41, Claim 22, delete "lack" and insert -- back --, therefor.

Signed and Sealed this
Twenty-first Day of January, 2020

Andrei Iancu
*Director of the United States Patent and Trademark Office*